US012012964B2

(12) United States Patent
Borvonrungreung

(10) Patent No.: US 12,012,964 B2
(45) Date of Patent: Jun. 18, 2024

(54) COMPRESSOR WITH A SUCTION VALVE HAVING A SPRING, A SEAL, AND A CYLINDRICAL SUCTION VALVE BODY

(71) Applicant: SIAM COMPRESSOR INDUSTRY CO., LTD., Chonburi (TH)

(72) Inventor: Thongchai Borvonrungreung, Chonburi (TH)

(73) Assignee: SIAM COMPRESSOR INDUSTRY CO., LTD., Chonburi (TH)

( * ) Notice: Subject to any disclaimer, the term of this patent is extended or adjusted under 35 U.S.C. 154(b) by 0 days.

(21) Appl. No.: 18/003,202

(22) PCT Filed: Jul. 31, 2020

(86) PCT No.: PCT/IB2020/057256
§ 371 (c)(1),
(2) Date: Dec. 23, 2022

(87) PCT Pub. No.: WO2022/023798
PCT Pub. Date: Feb. 3, 2022

(65) Prior Publication Data
US 2023/0250822 A1 Aug. 10, 2023

(51) Int. Cl.
*F04C 29/12* (2006.01)
*F04C 18/02* (2006.01)
(Continued)

(52) U.S. Cl.
CPC ........ *F04C 29/126* (2013.01); *F04C 18/0215* (2013.01); *F04C 29/124* (2013.01);
(Continued)

(58) Field of Classification Search
CPC .............. F04C 29/126; F04C 18/0215; F04C 29/124; F04C 2230/60; F16K 15/08;
(Continued)

(56) References Cited

U.S. PATENT DOCUMENTS 1,625,367 A * 4/1927 Kennon ................ F16K 15/063
137/906

FOREIGN PATENT DOCUMENTS

| CN | 2856497 Y | * | 1/2007 |
| CN | 104047848 A |   | 9/2014 |
| CN | 204239267 U |   | 4/2015 |
| EP | 2434159 A2 |   | 3/2012 |

(Continued)

OTHER PUBLICATIONS

Foreign and Machine Translation of Japanese Patent JP 2014-240626A, inventor: Tomohito et al; Title: Hermetic electric compressor; Published: Dec. 25, 2014 (Year: 2014).*

(Continued)

*Primary Examiner* — Mary Davis
(74) *Attorney, Agent, or Firm* — Posz Law Group, PLC

(57) ABSTRACT

The present invention discloses a compressor comprising: an outer pipe being connected from an outside to pass through the vessel; an inner pipe being closely inserted into the outer pipe; a compression mechanism including a suction hole formed of a blind hole and a suction valve in the suction hole. The suction valve includes a seal on a side facing an opening of the suction hole to seal an entire end of the inner pipe on a side facing the suction valve when the compressor stops.

10 Claims, 6 Drawing Sheets

(51) Int. Cl.
　　　*F16K 15/08*　　　(2006.01)
　　　*F16L 13/007*　　　(2006.01)
　　　*F16L 25/00*　　　(2006.01)

(52) U.S. Cl.
　　　CPC .......... *F16K 15/08* (2013.01); *F16L 13/007* (2013.01); *F16L 25/0072* (2013.01); *F04C 2230/60* (2013.01); *F05C 2201/0448* (2013.01); *F05C 2201/0475* (2013.01); *Y10T 137/7922* (2015.04); *Y10T 137/7925* (2015.04); *Y10T 137/7929* (2015.04); *Y10T 137/7936* (2015.04)

(58) Field of Classification Search
　　　CPC ............... F16L 13/007; F16L 25/0072; F05C 2201/0448; F05C 2201/0475; Y10T 137/7922; Y10T 137/7925; Y10T 137/7929; Y10T 137/7936
　　　See application file for complete search history.

(56) References Cited

FOREIGN PATENT DOCUMENTS

| | | |
|---|---|---|
| JP | 2019-105195 A | 6/2019 |
| WO | 2019/045656 A1 | 3/2019 |

OTHER PUBLICATIONS

Written Opinion of the International Searching Authority issued Feb. 3, 2022 in corresponding International Patent Application No. PCT/IB2020/057256.

* cited by examiner

COMPRESSOR WITH A SUCTION VALVE HAVING A SPRING, A SEAL, AND A CYLINDRICAL SUCTION VALVE BODY

CROSS REFERENCE TO RELATED APPLICATION

This application is a U.S. national stage application of PCT/IB2020/057256 filed on Jul. 31, 2020, the contents of which are incorporated herein by reference.

FIELD OF INVENTION

The present invention relates to a compressor.

BACKGROUND OF THE INVENTION

It is known that a compressor includes a compression mechanism, a suction valve, a suction pipe through which a refrigerant is sucked, and a cushion plate which is formed independently of the suction valve as a seal and mounted at the lower end of the suction pipe, as disclosed in International Publication No. WO2017/042969A1 hereinafter called PTL1.

In the compressor described in PTL1, when the compressor is stopped, the suction valve moves to a predetermined position where the suction valve is in contact with the cushion plate, and this enables to prevent the refrigerant from leaking to the compression mechanism.

If the suction valve is not moved to the predetermined position when the compressor stops, there is a possibility that the refrigerant leaks from the high pressure side to the low pressure side while the compressor stops.

Moreover, in case that the compressor is used in a condensing unit for cooling the interior of a showcase, if a temperature of the inside of the showcase reaches a predetermined value, the compressor stops temporarily so that the temperature of the inside of the showcase does not lower. Furthermore, while the compressor stops temporarily, if the refrigerant leaks from the high pressure side to the low pressure side, this causes an increase of the temperature of the inside of the showcase.

Therefore, the development of a compressor that prevents the leakage of the refrigerant from the high pressure side to the low pressure side for a specified period after the compressor stops, is required.

CITATION LIST

Patent Literature

PTL 1: International Publication No. WO2017/042969A1

SUMMARY OF THE INVENTION

It is an objective of the present inventions to provide a compressor that prevents the leakage of the refrigerant from the high pressure side to the low pressure side for a specified period after the compressor stops.

In order to achieve the above objective, an embodiment of the present invention provides a compressor comprising: a vessel configured to store a lubricating oil therein; an outer pipe being connected from an outside to pass through the vessel; an inner pipe being closely inserted into the outer pipe and arranged in the vessel; a suction pipe being closely inserted into the outer pipe and through which a refrigerant is sucked; a rotary shaft being accommodated in the vessel; and a compression mechanism, which is accommodated in the vessel, and configured to compress the refrigerant sucked from the suction pipe through rotation of the rotary shaft.

The compression mechanism includes a suction hole formed of a blind hole to extend in an axial direction of the outer pipe, and the outer pipe is closely inserted into an opening of the suction hole. The compressor includes a suction valve, which is arranged in the suction hole, and is configured to allow a flow of the refrigerant from the suction pipe into a compression chamber of the compression mechanism. The suction valve includes a seal on a side facing the opening of the suction hole, and is configured to move together with the seal in the suction hole. The seal is configured to seal an entire end of the inner pipe on a side facing the suction valve when the compressor stops.

According to the embodiment of the present invention, firstly, the suction valve which is arranged in the suction hole, is configured to allow a flow of the refrigerant from the suction pipe into a compression chamber of the compression mechanism when the compressor is operating. As such, the refrigerant from the suction pipe is compressed in the compression chamber of the compression mechanism.

Secondly, since the seal is configured to seal an entire end of the inner pipe on a side facing the suction valve when the compressor stops, the suction valve prevents a backward flow of the refrigerant from the compression chamber (high pressure side) to the suction hole (low pressure side).

In particular, the suction valve includes the seal on the side facing the opening of the suction hole and is configured to move together with the seal in the suction hole, the suction valve is certainly moved to the predetermined position when the compressor stops.

As such, for example, even if the compressor is used in a condensing unit for cooling the interior of a showcase as well as the compressor stops temporarily so that the temperature of the inside of the showcase does not lower, it is possible to prevent the refrigerant leaks from the high pressure side to the low pressure side while the compressor stops temporarily. As a result, it is possible to prevent an increase of the temperature of the inside of the showcase.

Therefore, it is possible for the compressor to prevent the leakage of the refrigerant from the high pressure side to the low pressure side for the specified period after the compressor stops.

BRIEF DESCRIPTION OF DRAWINGS

The principle of the present invention and its advantages will become apparent in the following description taking in consideration with the accompanying drawings in which.

DETAILED DESCRIPTION OF EMBODIMENTS OF THE INVENTION

Figure 1:
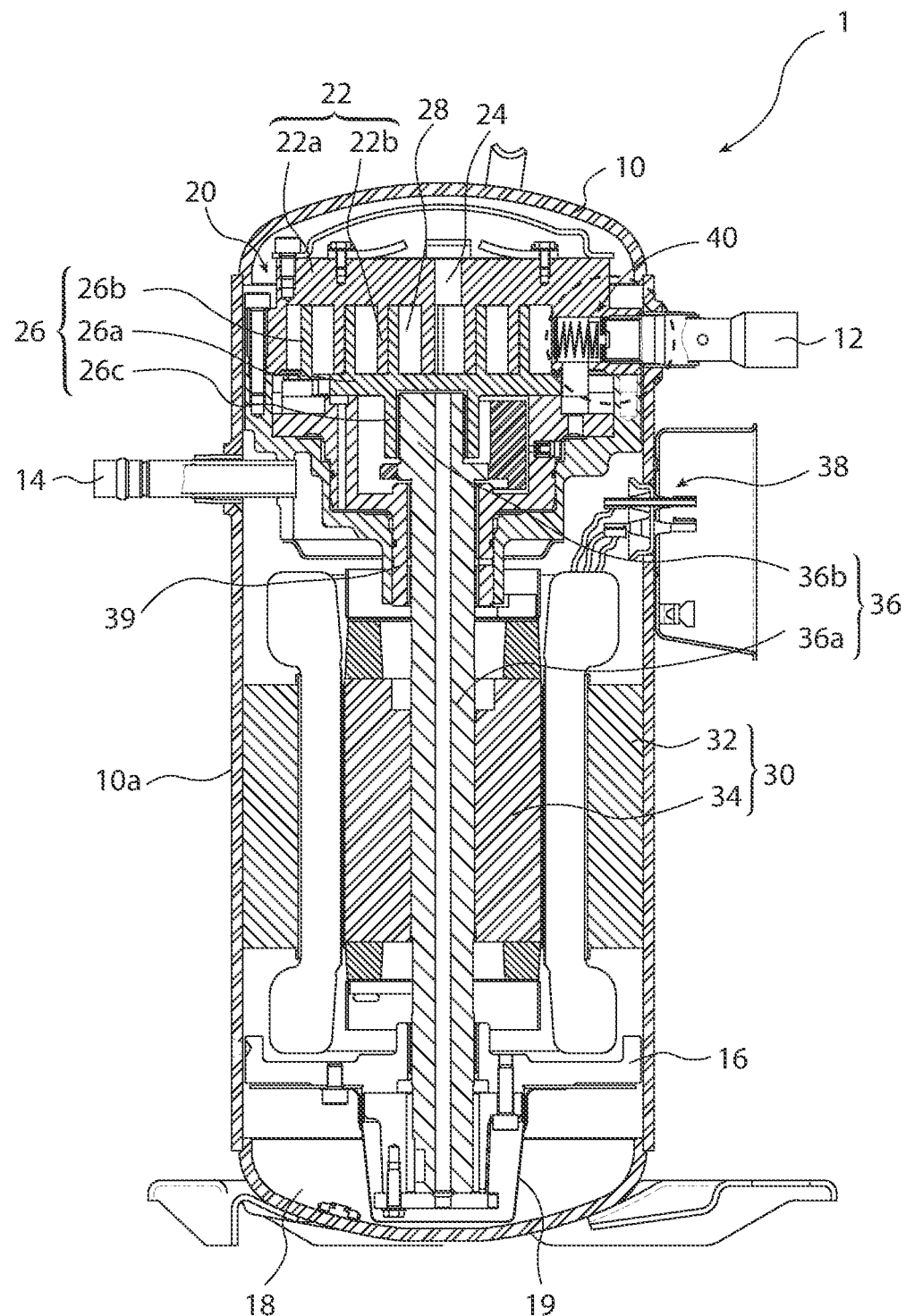
FIG. 1 is an explanation view illustrating a schematic configuration of a compressor 1 including a suction valve 40 according to an embodiment of the present invention.

Hereinafter, an embodiment of the present invention will be described in detail with reference to the drawings. In the drawings, the same or corresponding parts are denoted by the same reference symbols, and description thereof is omitted or simplified as appropriate. Moreover, shapes, sizes, arrangements, and other factors of components illustrated in the drawings may be changed as appropriate without departing from the scope of the invention.

FIG. 1 is an explanation view illustrating a schematic configuration of a scroll compressor 1 according to the embodiment. The compressor 1 is a fluid machine configured to compress and discharge a fluid (e.g., gas refrigerant), and can be a component of a refrigeration cycle apparatus, for example, in a refrigerator, a freezer, an automatic vending machine, an air-conditioning apparatus, a refrigeration unit, a condensing unite, and a water heater. The compressor 1 according to the embodiment is a vertically-mounted shell compressor 1, and for example, used in a condensing unit for cooling the interior of a showcase.

As shown in FIG. 1, the compressor 1 includes a vessel 10 as a sealed container, a suction pipe 12 mounted penetratingly a side face of the vessel 10 and formed as a hollow cylindrical pipe, a discharge pipe 14 discharging the fluid to the outside, a scroll compression mechanism 20 configured to compress a fluid (low-pressure gas refrigerant) in a compression chamber 28, and a motor element 30 configured to drive the compression mechanism 20 are housed in the vessel 10.

The upper portion of the compression mechanism 20 is supported by a middle shell 10a of the vessel 10. The compression mechanism 20 is fixed to the middle shell 10a of the vessel 10 through shrink fit or other method. A sub-frame 16 is provided below the motor element 30. The sub-frame 16 is fixed to the inner circumferential surface of the vessel 10. An oil sump 18 is formed on a bottom of the vessel 10. A refrigerating machine oil lubricating sliding parts such as bearings is accumulated in the oil sump 18.

The suction pipe 12 configured to suck a fluid (low-pressure gas refrigerant) into the compression mechanism 20 from outside is connected to a side face of the vessel 10. The discharge pipe 14 configured to discharge the fluid (high-pressure gas refrigerant) to the outside of the compressor 1 is connected to a side face of the vessel 10.

The compression mechanism 20 is accommodated in the vessel 10 and configured to compress the refrigerant sucked from the suction pipe 12 through rotation of a rotary shaft 36 that is rotated by the motor element 30. As shown in FIG. 1, the compression mechanism 20 includes a fixed scroll 22 and an orbiting scroll 26.

The fixed scroll 22 is fixed to the middle shell 10a at a lower end portion of the fixed scroll 22. The fixed scroll 22 includes a base plate 22a and a first scroll body 22b having an involute curve shape and erected on one surface of the base plate 22a. A discharge port 24 configured to discharge a compressed fluid is formed in a central part of the fixed scroll 22.

The orbiting scroll 26 is configured to orbit opposed to the fixed scroll 22 without rotating, by a non-illustrated Oldham mechanism. The orbiting scroll 26 includes a base plate 26a and a second scroll body 26b having an involute curve shape and erected on one surface of the base plate 26a. An orbiting bearing 26c formed in a bottomed cylindrical shape is formed in a substantially central part on an undersurface of the base plate 26a. An eccentric shaft portion 36b installed on an upper end of a rotating shaft portion 36 described later is inserted in the orbiting bearing 26c, in order to cause the orbiting scroll 26 to orbit.

The second scroll body 26b is configured to be engaged with the first scroll body 22b to form the compression chamber 28 between the first scroll body 22b and the second scroll body 26b. The orbiting scroll 26 is configured to orbit opposed to the fixed scroll 22.

The motor element 30 includes an electric motor stator 32 fixed to the inner circumferential surface of the vessel 10 through shrink fit or other method, an electric motor rotor 34 rotatably housed on an inner circumferential side of the electric motor stator 32, and the rotary shaft 36 (main shaft portion 36a) fixed to the electric motor rotor 34 through shrink fit or other method. The electric motor stator 32 is connected to a glass terminal 38 via lead wires. The electric motor stator 32 is supplied with electric power from outside via the glass terminal 38 and lead wires. The electric motor rotor 34 is configured to rotate as electric power is supplied to the electric motor stator 32 and transmit a driving force to the orbiting scroll 26 through the rotary shaft 36.

An eccentric shaft portion 36b located above the electric motor rotor 34 in the rotary shaft 36 is rotatably supported in a radial direction by the cylindrical orbiting bearing 26c installed under the base plate 26a. The main shaft portion 36a is fitted in a main bearing 39 and slides along the main bearing 39 by an oil film of a lubricating oil. The eccentric shaft portion 36b eccentric to the main shaft portion 36a is installed on the upper end of the rotary shaft 36.

A part of the rotary shaft 36 located below the electric motor rotor 24 is rotatably supported by the sub-frame 16.

A pump element 19 such as a positive displacement pump is installed at a lower end of the rotary shaft 36. The pump element 19 supplies the refrigerating machine oil accumulated in the oil sump 18 to the sliding parts such as the main bearing 39. The pump element 19 is mounted on the sub-frame 16 and supports the rotary shaft 36 in the axial direction on an upper end surface of the pump element 19.

Figure 2:
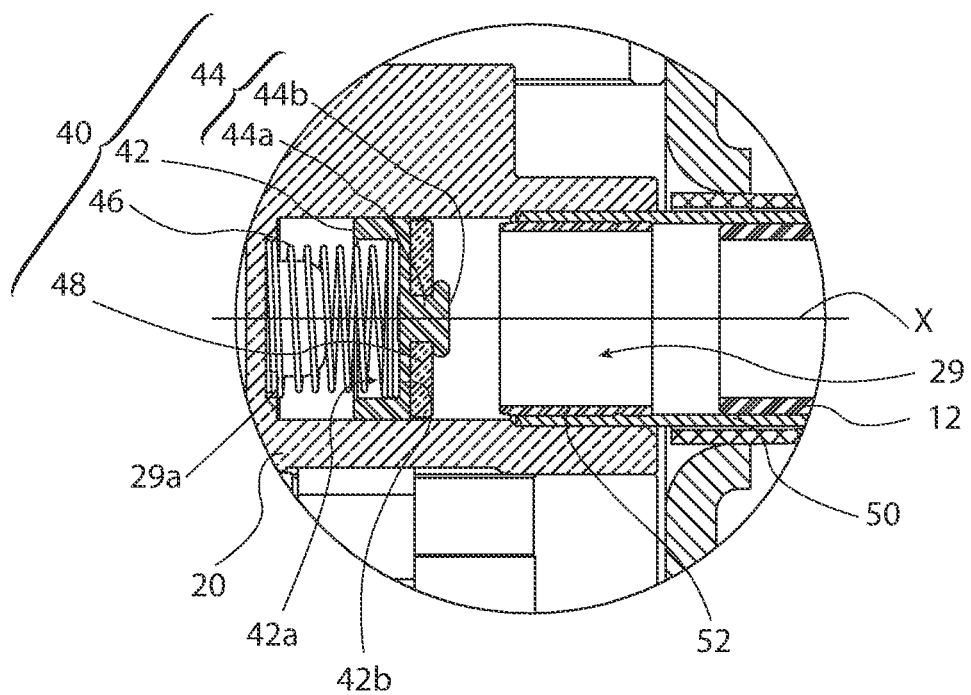
FIG. 2 is an enlarged view of a peripheral structure of the suction valve 40, which is surrounded by a broken line in FIG. 1, and is a view for illustrating a state in which the suction valve 40 is opened.
Figure 3:
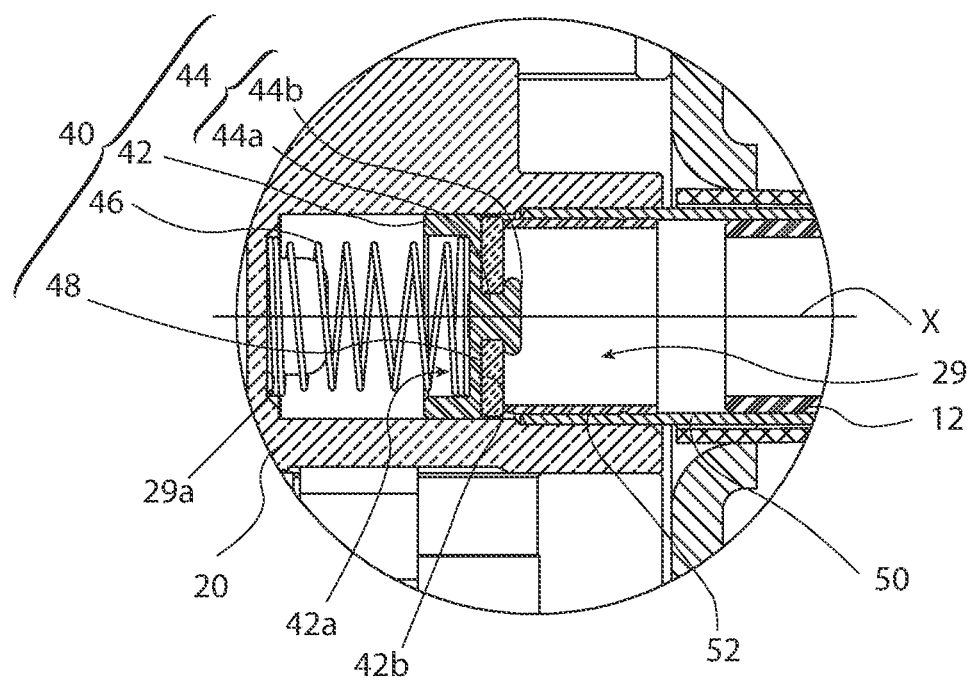
FIG. 3 is an enlarged view of the peripheral structure of the suction valve 40, which is surrounded by a broken line in FIG. 1, and is a view for illustrating a state in which the suction valve 40 is closed.

As shown in FIG. 1, FIG. 2 and FIG. 3, the compression mechanism 20 of the compressor 1 according to the embodiment, includes a suction hole 29 formed of a blind hole. The suction hole 29 is formed in a bottomed cylindrical shape, and includes a recessed end surface 29a in a center side of the compression mechanism 20 as a bottom part of the bottomed cylindrical shape. The refrigerant sucked through the suction pipe 12 flows into the suction hole 29.

The suction hole 29 is formed to extend from a side of the end surface 29a to a side of the middle shell 10a. An inner wall of the suction hole 29 includes a stepped portion 29b where a radius of the suction hole cross section smoothly increases from a side of the end surface 29a to a side of the middle shell 10a in an axial direction of the suction hole 29.

Figure 5:
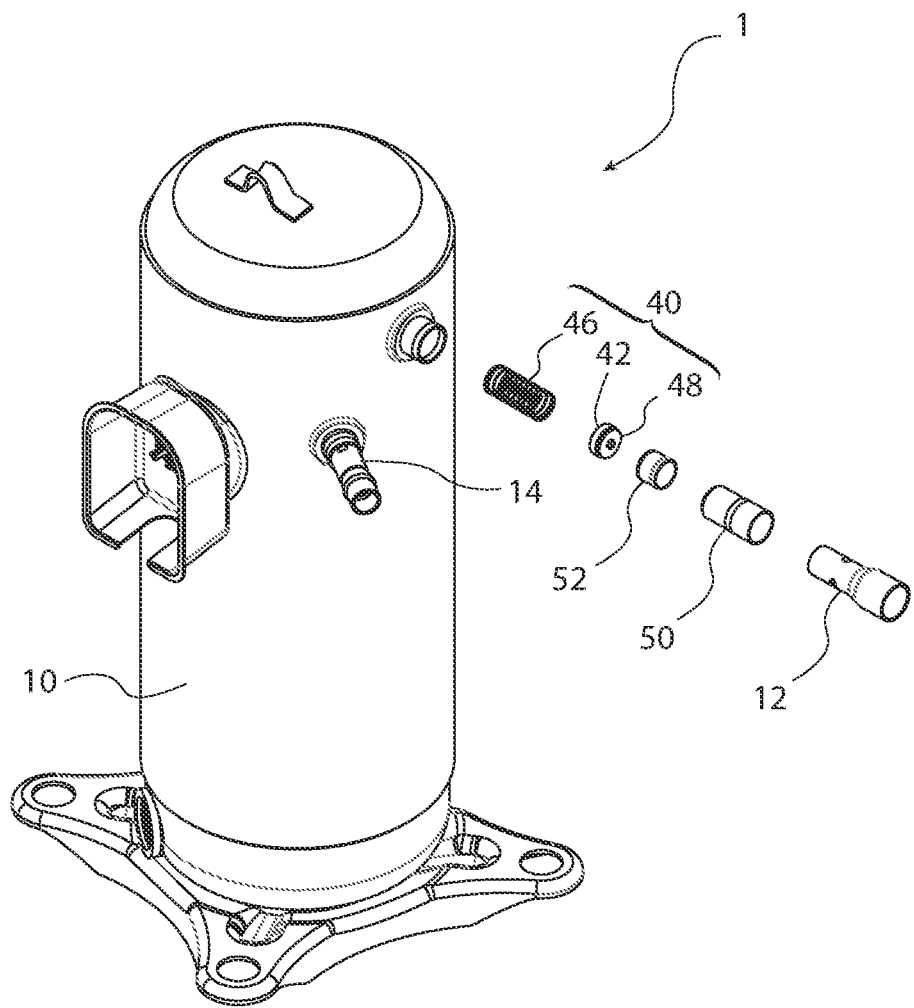
FIG. 5 is an exploded perspective view of the compressor 1.

As shown in FIG. 5, an outer pipe 50 is a hollow cylindrical pipe and connected from an outside to pass through the vessel 10 is closely inserted into the suction hole 29. When the outer pipe 50 is inserted into the suction hole 29, an end 50a of the outer pipe 50 at a side of the end surface 29a is formed in an annular shape.

Also, the outer pipe 50 is formed so that the external diameter of the outer pipe 50 is larger than the inner diameter of the suction hole 29 at the side of the end surface 29a as well as is the same as the inner diameter of the suction hole 29 at the side of the middle shell 10a. As such, when the outer pipe 50 is inserted into the suction hole 29, the end 50a of the outer pipe 50 is located at the position where the end 50a contacts with the stepped portion 29b.

As shown in FIG. 5, the inner pipe 52 is a hollow cylindrical pipe and closely inserted into the outer pipe 50 and arranged in the vessel 10. Namely, the external diameter of the inner pipe 52 is formed to be the same as the inner diameter of the outer pipe 50. Moreover, the suction pipe 12 is closely inserted into the outer pipe 50.

Also, an end 52a of the inner pipe 52 at a side of the end surface 29a is formed in an annular shape. When the inner pipe 52 is closely inserted into the outer pipe 50, the end 52a of the inner pipe 52 is located on the inside of the end 50a of the outer pipe 50 in the axial direction of the suction hole 29.

Regarding hardness of the inner pipe 52, the outer pipe 50 and the suction pipe 12, hardness of the inner pipe 52 is harder than hardness of the outer pipe 50 as well as hardness of the suction pipe 12 is harder than hardness of the outer pipe 50. For example, the inner pipe 52 and the suction pipe 12 are made by steel, and the outer pipe 50 is made by copper.

When the inner pipe 52 (suction pipe 12) is inserted inside the outer pipe 50, it is possible to enhance contact property between the outer pipe 50 and the inner pipe 52 (suction pipe 12). As a result, since the inner pipe 52 (suction pipe 12) is installed firmly inside the outer pipe 50, it is possible to improve accuracy of a set position of the inner panel (suction pipe 12). Therefore, the leakage of the refrigerant from the high pressure side to the low pressure side for a specified period is surely prevented.

Moreover, the compressor 1 includes a suction valve 40, which is arranged in the suction hole 29, and is configured to allow a flow of the refrigerant from the suction pipe 12 into the compression chamber 28 of the compression mechanism 20. The suction valve 40 functions as a check valve so that a force of stopping the reverse rotation of the rotary shaft 36 is exerted on the eccentric shaft portion 36b of the rotary shaft 36.

FIG. 2 is an enlarged view of a peripheral structure of the suction valve 40, which is surrounded by a broken line in FIG. 1, and is a view for illustrating a state in which the suction valve 40 is opened. FIG. 3 is an enlarged view of the peripheral structure of the suction valve 40, which is surrounded by a broken line in FIG. 1, and is a view for illustrating a state in which the suction valve 40 is closed. In FIG. 2 and FIG. 3, a line X shows an axis of the suction hole 29.

As shown in FIG. 2, FIG. 3, FIG. 4C and FIG. 4D, the suction valve 40 includes a suction valve body 42 which is formed in a bottomed cylindrical shape and provided with a hollow part 42a defined therein, a projection portion 44 which is integrally formed with the suction valve body 42, a spring 46 configured to urge the suction valve body 42 in a direction of sealing the entire end 52a of the inner pipe 52 on the side facing the suction valve 40. The spring 46 is formed to fit the recessed end surface 29a of the suction hole 29.

Moreover, the suction valve 40 includes a seal 48 on a side facing an opening 29c (not shown) of the suction hole 29, and is configured to move together with the seal 48 in the suction hole 29. The seal 48 is made of a synthetic resin, but is not limited thereto. For example, The seal 48 may be made of a rubber material.

The projection portion 44 includes a shaft part 44a which is formed on a seal mounting surface 42b of the suction valve body 42 for mounting the seal 48 opposite to the hollow part 42a to extend from the seal mounting surface 42b in an axial direction of the suction valve 40, and a head part 44b which is connected to the shaft part 44a and formed in a plate shape.

The seal 48 is formed in a disk shape and includes a through hole 48a which is provided at a center portion thereof and into which the shaft part 44a is inserted. Moreover, the seal 48 is configured to seal an entire end 52a of the inner pipe 52 on a side facing the suction valve 40 when the compressor 1 stops.

As shown in FIG. 2 and FIG. 3, the projection portion 44 is formed in a cross-sectional T-shape in the axial direction of the suction valve 40. As such, the seal 48 is securely fixed onto the seal mounting surface 42b of the suction valve body 42 by the projection portion 44, with a simple structure.

Next, an operation of the suction valve 40 is described in details with reference to FIG. 2 and FIG. 3.

During an operation of the compressor 1 (See FIG. 2), the sucked refrigerant flows from the suction pipe 12 into the suction hole 29. By a force generated by a flow of the sucked refrigerant, the spring 46 is shrunk to move the suction valve body 42 to a radially inner side. By the radially inner movement of the suction valve body 42, the refrigerant flows into the compress chamber 28 through the opening 29c between the end surface 29a and the suction valve body 42.

In this manner, the suction valve body 42 can be smoothly moved to the radially inner side. As such, the refrigerant from the suction pipe 12 is compressed in the compression chamber 28 of the compression mechanism 20.

When the operation of the compressor 1 is stopped, the suction valve body 42 is pressed by a spring force of the spring 46 from the radially inner side to the radially outer side. Further, the rotary shaft 36 is rotated reversely due to a differential pressure between the compression chamber 28 and the suction hole 29, and hence the high-pressure refrigerant in the compression chamber 28 flows into the suction hole 29 via the opening 29c. The refrigerant flows into the hollow part 42a of the suction valve body 42 through the opening 29c. In this manner, a pressure in the hollow part 42a is boosted to act as a force for pressing the suction valve body 42 to the radially outer side.

Moreover, when the operation of the compressor 1 is stopped as described above, the spring force of the spring 46 and the pressure of the high-pressure refrigerant, which is generated by the reverse rotation, act on the suction valve body 42 in a direction of closing the suction valve body 42. The suction valve body 42 is moved from the radially inner side to the radially outer side inside the suction hole 29 by the spring force and the pressure of the refrigerant.

As a result, the seal 48 seals an entire end 52a of the inner pipe 52 on a side facing the suction valve 40 when the compressor 1 stops. In this manner, an opening formed by the entire end 52a of the inner pipe 52 is closed by the seal 48 of the suction valve body 42 to function as a suction check valve. Since the opening formed by the entire end 52a of the inner pipe 52 is closed by the suction valve 40 to stop the reverse rotation of the rotary shaft 36, the suction valve 40 prevents a backward flow of the refrigerant from the compression chamber 28 (high pressure side) to the suction hole 29 (low pressure side).

In this fashion, the backward flow of the refrigerant from the compression chamber 28 into the suction pipe 12 is prevented, while outflow of the lubricating oil in the oil sump 18 from the suction pipe 12 to outside can be suppressed.

Furthermore, the suction valve 40 according to the embodiment is certainly moved to the predetermined position so as to seal an entire end 52a of the inner pipe 52 on a side facing the suction valve 40 when the compressor 1 stops. As such, for example, even if the compressor 1 is used in a condensing unit for cooling the interior of a showcase as well as the compressor 1 stops temporarily so that the temperature of the inside of the showcase does not lower, it is possible to prevent the refrigerant leaks from the high pressure side to the low pressure side while the compressor 1 stops temporarily. As a result, it is possible to prevent an increase of the temperature of the inside of the showcase.

Therefore, it is possible for the compressor 1 according to the embodiment to prevent the leakage of the refrigerant from the high pressure side to the low pressure side for the specified period after the compressor 1 stops.

Next, a method of manufacturing a compressor 1 with the suction valve 40 according to the embodiment, is described in details with reference to FIG. 4A to FIG. 4D, FIG. 5 and FIG. 6A to FIG. 6D.

First Preparation Step

Figures 4A, 4B:
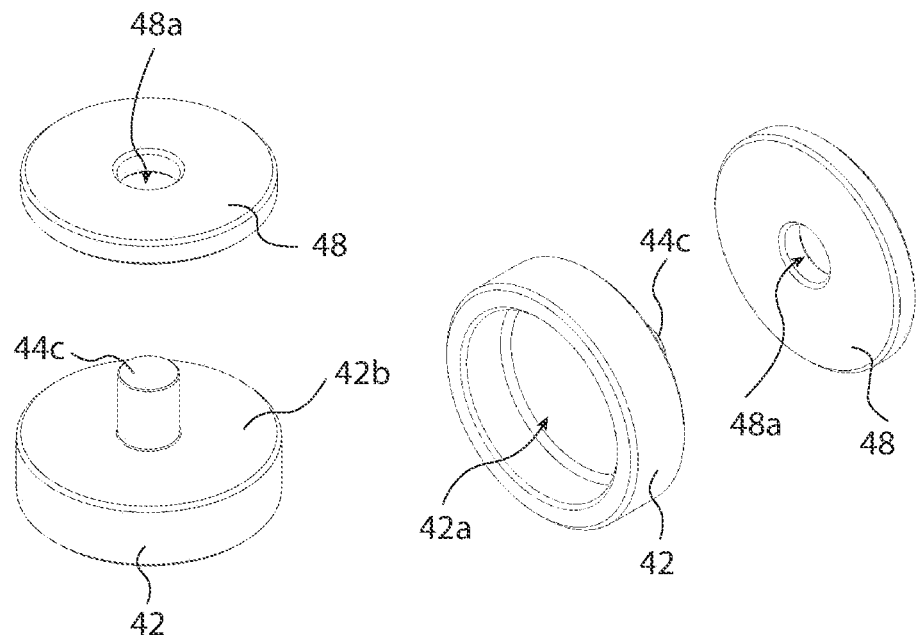
FIG. 4A is a perspective view of the suction valve body 42 and a seal 48 before a pressing step.
FIG. 4B is a perspective view of the suction valve body 42 and the seal 48 when viewed from another direction before the pressing step.
Figure 6A:
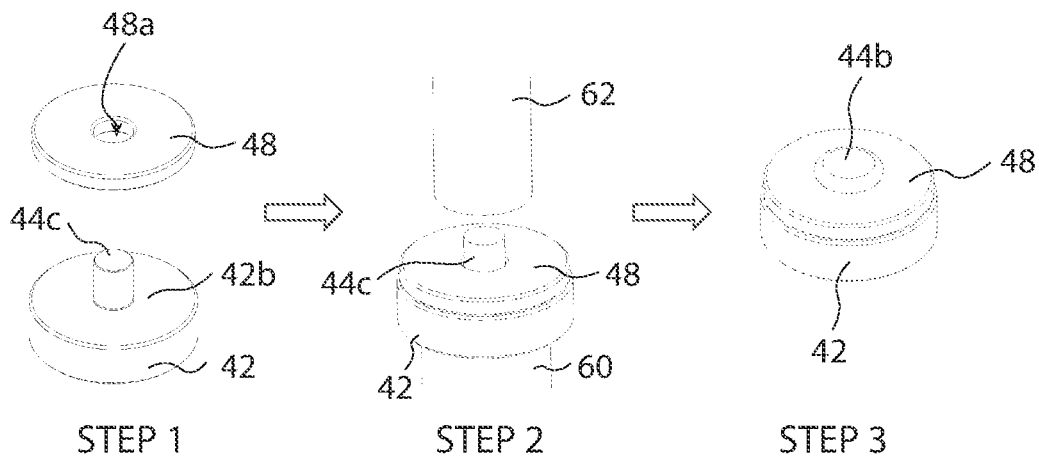
FIG. 6A is an explanation view about the manufacturing process of a projection portion 44 of the suction valve 40.

The suction valve body 42, the seal 48, and a shaft member 44c which is integrally formed with the suction valve body 42 on the seal mounting surface 42b are prepared (See FIG. 4A, FIG. 4B, STEP1 of FIG. 6A).

The suction valve body 42 is formed in a bottomed cylindrical shape and provided with a hollow part 42a defined therein. The seal 48 includes through hole 48a which is provided at a center portion thereof. The shaft member 44c is integrally formed with the suction valve body 42 on the seal mounting surface 42b and inserted into the through hole 48a to extend from the seal mounting surface 42b in an axial direction of the suction valve body 42.

Pressing Step

In the state where the shaft member 44c is inserted into the through hole 48a, the shaft member 44c is pressed between a jig 60 and a pressing member 62 which is formed to fit the hollow part 42a of the suction valve body 42 (See STEP2 of FIG. 6A).

Figures 4C, 4D:
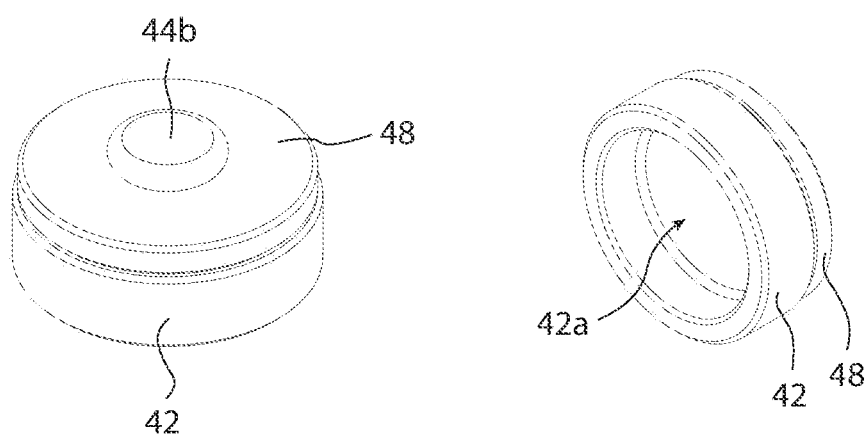
FIG. 4C is a perspective view of the suction valve body 42 and the seal 48 after the pressing step.
FIG. 4D is a perspective view of the suction valve body 42 and the seal 48 when viewed from another direction after the pressing step.

As a result of the pressing step, the shaft member 44c is deformed to the shaft part 44a formed on the seal mounting surface 42b and the head part 44b connected to the shaft part 44a in the plate shape (See FIG. 4C to FIG. 4D and STEPS of FIG. 6A). As such, the projection portion 44 is integrally formed with the suction valve body 42, and the projection portion 44 is formed in a cross-sectional T-shape in the axial direction of the suction valve body 42. Furthermore, the seal 48 is securely fixed onto the seal mounting surface 42b of the suction valve body 42 by the projection portion 44, with a simple structure.

Second Preparation Step

The suction valve 40 including the suction valve body 42, the projection portion 44, and the spring 46 which is provided in the hollow part 42 is prepared. Since the suction valve body 42 is integrally formed with the projection portion 44, it is easily to handle the suction valve 40 including the spring 46 which is provided in the hollow part 42.

Suction Valve Insertion Step

Figure 6B:
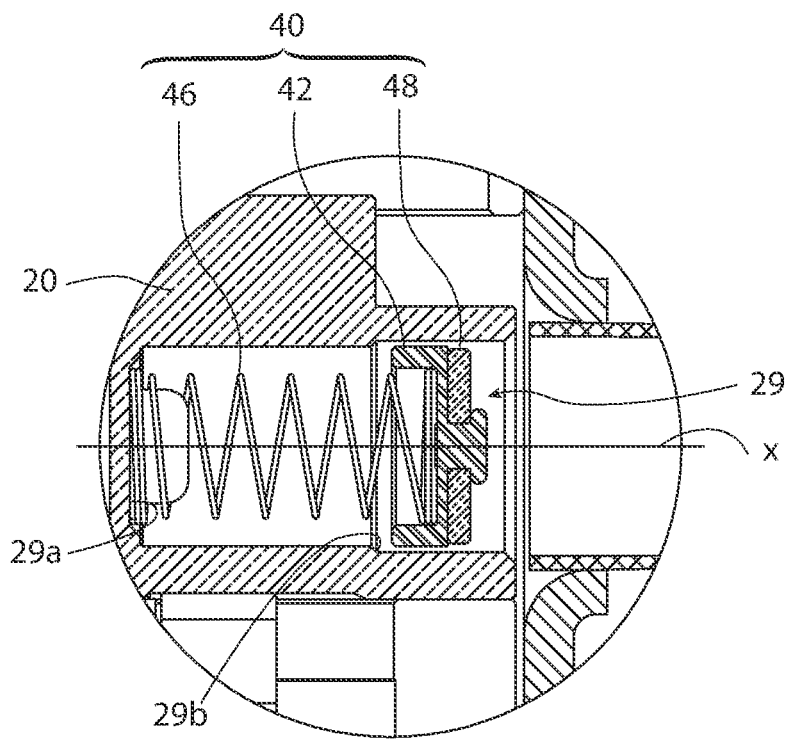
FIG. 6B is an explanation view about a process for inserting the suction valve 40 into a suction hole 29.

The suction valve 40 including the spring 46 is inserted into the suction hole 29 of a compression mechanism 20 (See FIG. 6B). The suction hole 29 is formed of a blind hole in a bottomed cylindrical shape, and includes the recessed end surface 29a in a center side of the compression mechanism 20 as a bottom part of the bottomed cylindrical shape. Since the spring 46 is formed to fit the recessed end surface 29a of the suction hole 29, it is possible to fix the suction valve 40 on the recessed end surface 29a.

Outer Pipe Insertion Step

Figure 6C:
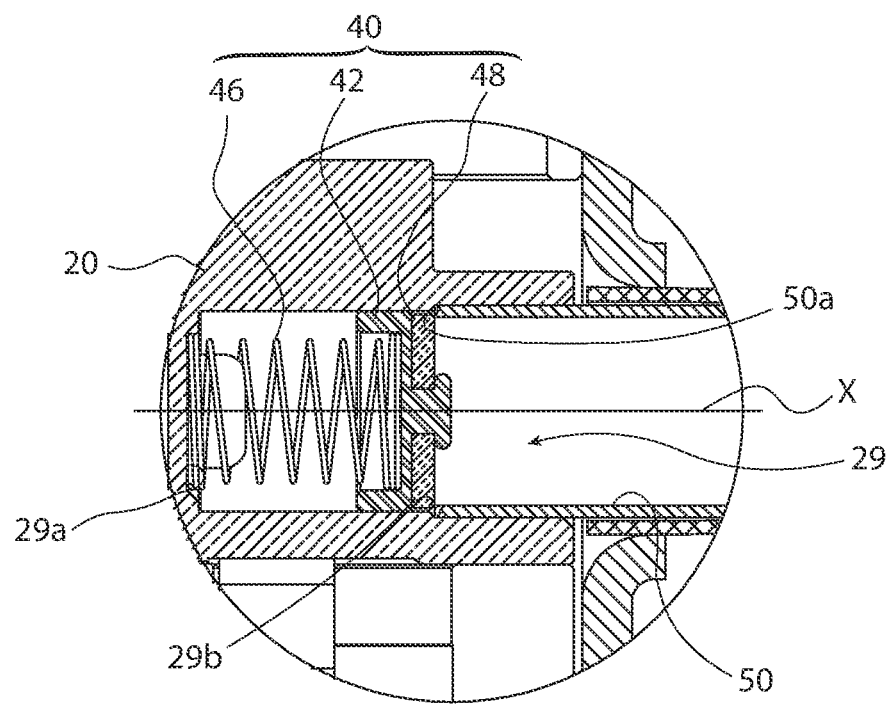
FIG. 6C is an explanation view about a process for inserting an outer pipe 50 into a suction hole 29.

The outer pipe 50 is closely inserted into the suction hole 29 (See FIG. 6C). The inner wall of the suction hole 29 includes the stepped portion 29b where the radius of the suction hole cross section smoothly increases from a side of the end surface 29a to a side of the middle shell 10a in an axial direction of the suction hole 29. As such, the end 50a of the outer pipe 50 is located at the position where the end 50a contacts with the stepped portion 29b.

Inner Pipe Insertion Step

The inner pipe 52 is closely inserted into the outer pipe 50 so that the inner pipe 52 is arranged in the vessel 10. In particular, when the inner pipe 52 is closely inserted into the outer pipe 50, the end 52a of the inner pipe 52 is located on the inside of the end 50a of the outer pipe 50 in the axial direction of the suction hole 29 (See FIG. 6D). Therefore, the seal 48 can be configured to seal the entire end 52a of the inner pipe 52 on a side facing the suction valve 40 when the compressor 1 stops.

Suction Pipe Insertion Step

Figure 6D:
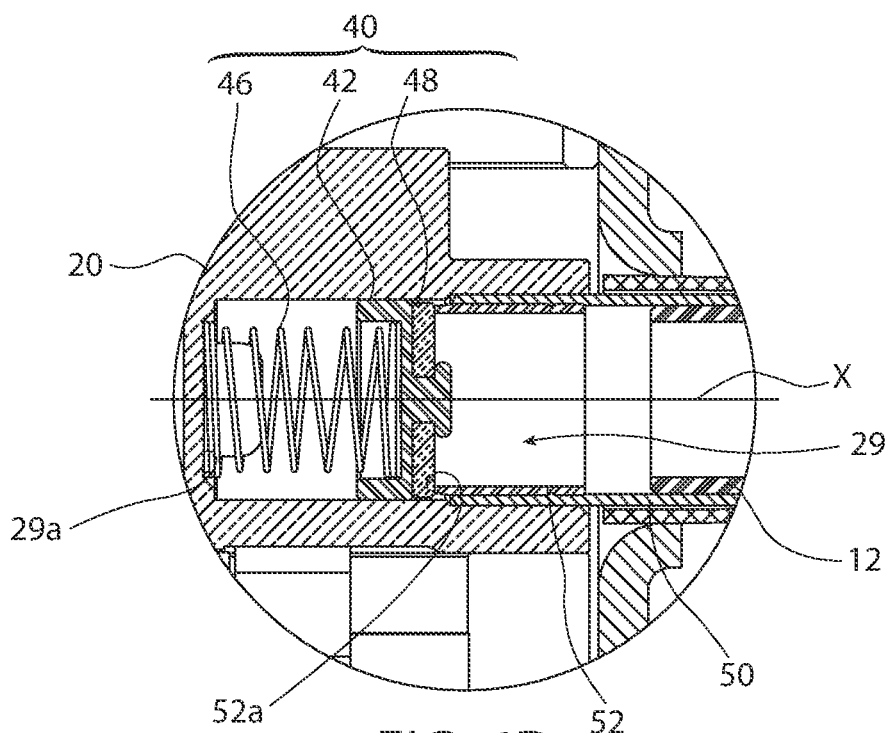
FIG. 6D is an explanation view about a process for inserting an inner pipe 52 into the outer pipe 50 and then closely inserting a suction pipe 12 into the outer pipe 50.

The suction pipe 12 is closely inserted into the outer pipe 50 so that the refrigerant is sucked through the suction pipe 12 (See FIG. 6D). As such, according to the method of manufacturing a compressor 1, it is possible to manufacture the suction valve 40 according to the embodiment, which can move between the recessed end surface 29a and the end 52a of the inner pipe 52.

Although specific embodiments of the invention have been disclosed and described as well as illustrated in the companying drawings, it is simply for the purpose of better understanding of the principle of the present invention and it is not as a limitation of the scope and spirit of the teaching of the present invention. Adaption and modification to various structures such as design or material of the invention, mounting mechanism of various parts and elements or embodiments are possible and apparent to a skilled person without departing from the scope of the present invention which is to be determined by the claims.

LIST OF REFERENCE

1: compressor
10: vessel

10a: middle shell
12: suction pipe
14: discharge pipe
16: sub-frame
18: oil sump
19: pump element
20: compression mechanism
22: fixed scroll
22a: base plate
22b: first scroll body
24: discharge port
26: orbiting scroll
26a: base plate
26b: second scroll body
26c: orbiting bearing
28: compression chamber
29: suction hole
29a: end surface
29b: stepped portion
29c: opening
30: motor element
32: electric motor stator
34: electric motor rotor
36: rotary shaft
36a: main shaft portion
36b: eccentric shaft portion
38: glass terminal
39: main bearing
40: suction valve
42: suction valve body
42a: hollow part
42b: seal mounting surface
44: projection portion
44a: shaft part
44b: head part
44c: shaft member
46: spring
48: seal
48a: through hole
50: outer pipe
50a: end of the outer pipe
52: inner pipe
52a: end of the inner pipe
60: jig
62: pressing member
X: axis of the suction hole

The invention claimed is:

1. A compressor comprising:
a vessel configured to store a lubricating oil therein;
an outer pipe being connected from an outside to pass through the vessel;
an inner pipe being closely inserted into the outer pipe and arranged in the vessel;
a suction pipe being inserted into the outer pipe so as to contact the outer pipe and through which a refrigerant is sucked;
a rotary shaft being accommodated in the vessel; and
a compression mechanism, which is accommodated in the vessel, and configured to compress the refrigerant sucked from the suction pipe through rotation of the rotary shaft;
wherein the compression mechanism includes a suction hole formed of a blind hole to extend in an axial direction of the outer pipe, and the outer pipe is closely inserted into an opening of the suction hole;
wherein the compressor includes a suction valve, which is arranged in the suction hole, and is configured to allow a flow of the refrigerant from the suction pipe into a compression chamber of the compression mechanism;
wherein the suction valve includes a seal on a side facing the opening of the suction hole;
wherein the seal is configured to seal an entire end of the inner pipe on a side facing the suction valve when the compressor stops;
wherein the suction valve comprises:
a suction valve body which is formed in a bottomed cylindrical shape and provided with a hollow part defined therein;
a projection portion which is integrally formed with the suction valve body; and
a spring configured to urge the suction valve body in a direction of sealing the entire end of the inner pipe on the side facing the suction valve;
wherein the projection portion includes a shaft part which is formed on a seal mounting surface for mounting the seal opposite to the hollow part to extend from the seal mounting surface in an axial direction of the suction valve, and a head part which is connected to the shaft part and formed in a plate shape;
wherein the head part is configured to hold the seal with the suction valve body such that the seal and the suction valve body move together in the suction hole;
wherein the seal includes a through hole which is provided at a center portion thereof and into which the shaft part is inserted; and
wherein the projection portion is formed in a cross-sectional T-shape in the axial direction of the suction valve.

2. The compressor of claim 1, wherein hardness of the inner pipe is harder than hardness of the outer pipe.

3. The compressor of claim 2, wherein the inner pipe is made by steel, and the outer pipe is made by copper.

4. A method of manufacturing the compressor of claim 1 comprising:
preparing the suction valve body which is formed in the bottomed cylindrical shape and provided with the hollow part defined therein, the seal which is provided on a seal mounting surface for mounting the seal opposite to the hollow part and includes the through hole which is provided at the center portion thereof, and a shaft member which is integrally formed with the suction valve body on the seal mounting surface and inserted into the through hole to extend from the seal mounting surface in an axial direction of the suction valve body;
pressing the shaft member to make the projection portion which is integrally formed with the suction valve body and in the cross-sectional T-shape in the axial direction of the suction valve body, wherein the projection portion includes the shaft part which is made by the shaft member and formed on the seal mounting surface, and the head part which is connected to the shaft part and formed in the plate shape;
preparing the suction valve including the suction valve body, the projection portion, and the spring which is provided in the hollow part;
inserting the suction valve into the suction hole of the compression mechanism, wherein the suction hole is formed of the blind hole;
closely inserting the outer pipe into the suction hole;
closely inserting the inner pipe into the outer pipe so that the inner pipe is arranged in the vessel; and
closely inserting the suction pipe into the outer pipe so that the refrigerant is sucked through the suction pipe.

5. The compressor of claim 1, wherein a hardness of the suction pipe is greater than a hardness of the outer pipe.

6. The compressor of claim 5, wherein the suction pipe comprises a steel suction pipe, and the outer pipe comprises a copper outer pipe.

7. The compressor of claim 1, wherein an inner wall of the suction hole includes a stepped portion, and an end of the outer pipe contacts the stepped portion.

8. The compressor of claim 7, wherein the end of the inner pipe is located between an end surface of the suction hole and the end of the outer pipe in an axial direction of the suction hole.

9. The compressor of claim 1, wherein the head part of the projection portion is formed at an end of the shaft part of the projection portion that is furthest from the suction valve body.

10. The compressor of claim 9, wherein the head part of the projection portion is integrally formed with the shaft part of the projection portion, and the head part is positioned on the seal on the side facing the opening of the suction hole.

* * * * *